United States Patent [19]
Dotti

[11] Patent Number: 4,528,148
[45] Date of Patent: Jul. 9, 1985

[54] METHOD AND APPARATUS FOR FORMING GROOVES IN AN OPTICAL FIBER SUPPORT

[75] Inventor: Enrico Dotti, Milan, Italy

[73] Assignee: Societa' Cavi Pirelli S.p.A., Milan, Italy

[21] Appl. No.: 390,653

[22] Filed: Jun. 21, 1982

[30] Foreign Application Priority Data

Jun. 26, 1981 [IT] Italy ............................. 22578 A/81

[51] Int. Cl.³ .............................................. G02B 5/14
[52] U.S. Cl. ...................................... 264/1.5; 264/2.7; 264/284; 264/293; 350/96.23; 425/385; 425/392
[58] Field of Search ....................... 350/96.23; 264/1.5, 264/1.6, 1.7, 2.7, 284, 293; 425/335, 385, 392

[56] References Cited

U.S. PATENT DOCUMENTS

| | | | |
|---|---|---|---|
| 1,668,004 | 5/1928 | Caron | 144/12 |
| 2,303,888 | 12/1942 | Miller | 264/284 X |
| 2,867,001 | 1/1959 | Lewis et al. | 264/284 X |
| 3,331,674 | 7/1967 | Ireland | 264/284 X |
| 3,435,107 | 3/1969 | Conrad | 264/293 X |
| 4,154,049 | 5/1979 | King et al. | 350/96.23 |
| 4,155,963 | 5/1979 | Vecchis et al. | 350/96.23 X |
| 4,205,899 | 6/1980 | King et al. | 350/96.23 |
| 4,221,513 | 9/1980 | Dubois et al. | 409/131 |
| 4,354,732 | 10/1982 | Arnaud et al. | 350/96.23 |
| 4,361,381 | 11/1982 | Williams | 350/96.23 |

FOREIGN PATENT DOCUMENTS

| | | |
|---|---|---|
| 2519050 | 11/1976 | Fed. Rep. of Germany ... 350/96.23 |
| 421299 | 12/1934 | United Kingdom . |
| 732627 | 6/1955 | United Kingdom . |
| 849916 | 9/1960 | United Kingdom . |
| 867878 | 5/1961 | United Kingdom . |
| 949177 | 2/1964 | United Kingdom . |
| 987733 | 3/1965 | United Kingdom . |
| 1156691 | 7/1969 | United Kingdom . |
| 1262466 | 2/1972 | United Kingdom . |
| 1267517 | 3/1972 | United Kingdom . |
| 1319240 | 6/1973 | United Kingdom . |

OTHER PUBLICATIONS

Boscher et al., "Optical Fiber Cables Using V-Grooved Cylindrical Units: High Performance Cables", *Fiber and Integrated Optics*, vol. 4, No. 1, pp. 67-94, 1982.

Primary Examiner—Jay H. Woo
Assistant Examiner—James C. Housel
Attorney, Agent, or Firm—Brooks Haidt Haffner & Delahunty

[57] ABSTRACT

A method and apparatus for forming grooves in a reinforced, thermoplastic filament and for inserting optical fibers in the grooves. The reinforced filament is pulled longitudinally through a die having rollers corresponding to the number of grooves, and the rollers are pressed against the thermoplastic material to form the grooves. The rollers may be at room temperature or may be heated to temperature above room temperature and below the melting point temperature of the thermoplastic material. The fibers are inserted in the grooves as the filament leaves the die and preferably, the filament is wrapped with a binding, e.g. a tape, after the fibers are inserted in the grooves so as to seal the grooves.

16 Claims, 3 Drawing Figures

METHOD AND APPARATUS FOR FORMING GROOVES IN AN OPTICAL FIBER SUPPORT

The present invention relates to a method and an apparatus for producing longitudinal grooves in a filament or an elongated cylindrical body, and particularly, in a filament of thermoplastic material reinforced with at least one longitudinal element that is resistant to tension and compression forces.

The grooved cylindrical body which is obtained with the method and the apparatus forming the object of the present invention, is used for constructing a grooved core adapted to receive within its grooves one or several optical fibers, in such a way as to form an elementary cable that can be used when making telecommunication cables.

The longitudinal grooves are preferably helicoidal, either with a helix of a single hand or a periodically alternating hand, but the grooves could also have some other form, such as, rectilineal, sinusoidal etc.

Among the known methods for creating grooves on a filament, the oldest method is the one which creates grooves at the time of the extrusion phase itself. Care has however to be taken in choosing the extrusion speed so as to obviate the grooved structure collapsing the moment that the plastic-material filament which is malleable at a high temperature, issues forth from the extrusion die.

Should it be desired to obtain helicoidal shaped longitudinal grooves, recourse must be had to an extruder with a rotary extruding die. With this system there can however be shown that there are undesired shearing stresses, when the plastic-material, extruded in one direction, becomes rapidly turned in a diverse direction. For the purpose of preventing this possibility from taking place, it is necessary to keep the extrusion speed low.

More recently, it was proposed to effectuate the longitudinal grooves in a filament, by making an incision in the thermoplastic material with heated sharp edges and with a low advancing speed for the filament itself. It is, however, practically impossible with this method to realize grooves devoid of any furrows. In fact, owing to the incision, the thermoplastic material becomes ruptured. Expressed in a better way, since the work takes place on plastic-material, the latter is first stretched by the advancing tools and it is only when it has exceeded the limits of its elastic stretchability, is it ripped, leaving burrs behind. These burrs, of course, are found in the elementary cable that is intended for containing the fibers in the grooves of the grooved core which comprises the safety of the fiber itself.

With the cutting method, there are also produced long and lightweight shavings, which require a special system for collecting and removal and thereby preventing them from becoming infiltrated in-between the gears of the apparatus to prevent compromising the production, since these shavings could create mechanical disturbances. These shavings can also become attracted by the fibers thereby jeopardizing their integrity should the device for producing the grooves be directly installed on a continuous production line for an elementary cable with optical fibers.

The present invention has, as one object, the obviating the above-stated drawbacks, by a method and apparatus for forming grooves, which obtains a product which is completely devoid of burrs, and hence, which has a smooth surface and which can be inserted into a continuous production line, at least in a line which starts from the grooves of elementary cables with optical fibers.

More particularly, the object of the present invention is a method for forming a plurality of longitudinal grooves in a filament of thermoplastic material which is reinforced by at least one longitudinal element that is resistant to tension and compression forces, so as to obtain a grooved core adapted to receive one or several optical fibers inside the groove for forming an elementary cable, said method comprising at least the following operations:

continuously feeding a reinforced filament of thermoplastic-material having its external diameter that is smaller by a predetermined amount than the final diameter of a circle circumscribing the grooved core;

guiding said filament along a pre-fixed advancing line;

pulling said filament for causing it to advance along said line; and upsetting, under selected pressure, said filament along the zones for the grooves, by means of a shaping-die comprising an assembly of upsetting means disposed coaxially along said advancing line.

A further object of the present invention is apparatus for carrying-out the above-indicated method, and comprising at least:

a means for feeding a longitudinally reinforced filament having its outer diameter smaller by a predetermined amount than the final diameter of a circle circumscribing the grooved core;

a means for guiding said filament along the line of advance;

a pulling means for causing said filament to advance along said line; and a means for shaping said grooves, comprising an assembly of upsetting means disposed coaxially with respect to said line of advance.

In a preferred form of the invention, the apparatus mentioned above, is characterized by the fact of being formed by at least one means for inserting the optical fiber inside the grooves, associated with a cage for carrying the bobbins for the optical fiber, and a means for sealing said grooves containing optical fibers, said inserting means and said sealing means being disposed coaxially to said line of advance between said shaping-die and said pulling means, and with the inserting means being disposed immediately downstream of the shaping-die and being succeeded by the sealing means.

Other objects and advantages of the present invention will be apparent from the following detailed description of the presently preferred embodiments thereof, which description should be considered in conjunction with the accompanying drawings in which.

Figure 1:
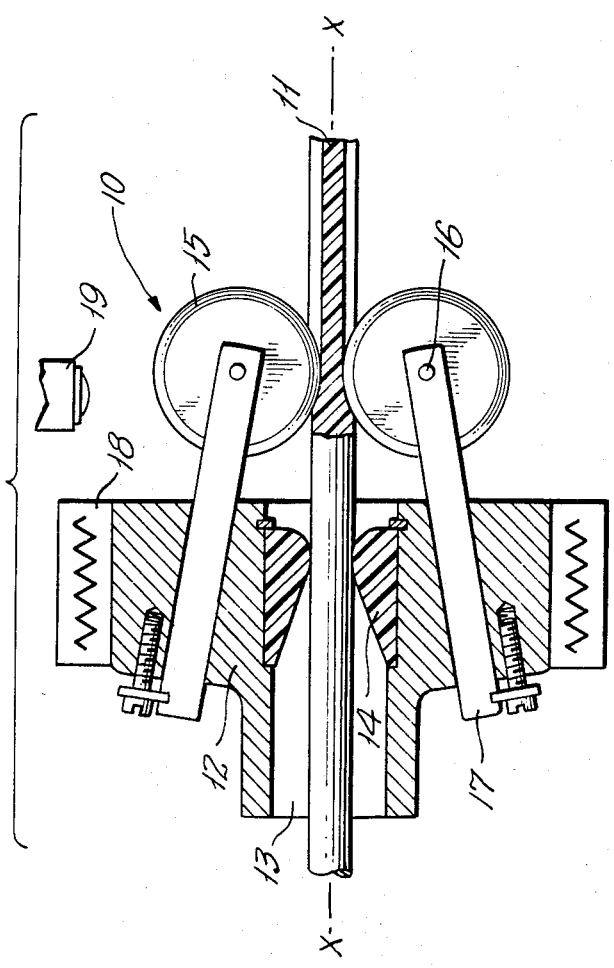
FIG. 1 is a longitudinal cross-section of a shaping-die for forming a plurality of longitudinal grooves in an elongated filament of thermoplastic material reinforced by at least one longitudinal element that is resistant to tension and compression forces.

FIG. 1 illustrates the principal part of the apparatus for forming grooves in a filament which is an elongated cylindrical body of plastic-material provided with a central, longitudinal reinforcing element that is resistant to tension and compession forces. The reinforcing element may, for example, be a wire or wires made from an iron-nickel alloy and which have a thermal coefficient of expansion close to that of glass.

The filament, which can have a length of up to 1000 meters or more and a diameter on the order of a few millimeters, is usually made from a theroplastic material, such as polyethylene, polypropylene, nylon etc. On its surface are formed grooves which are preferably, but not necessarily, helicoidal. Each groove is intended for receiving, preferably in a loose way, one or more optical fibers having a length which is greater, or equal to, the length of the groove in which it is received. The grooves containing optical fibers preferably are sealed with at least one binding wrapped around the filament. The filament, with the optical fibers, constitutes an elementary cable for telecommunications.

Figure 2:
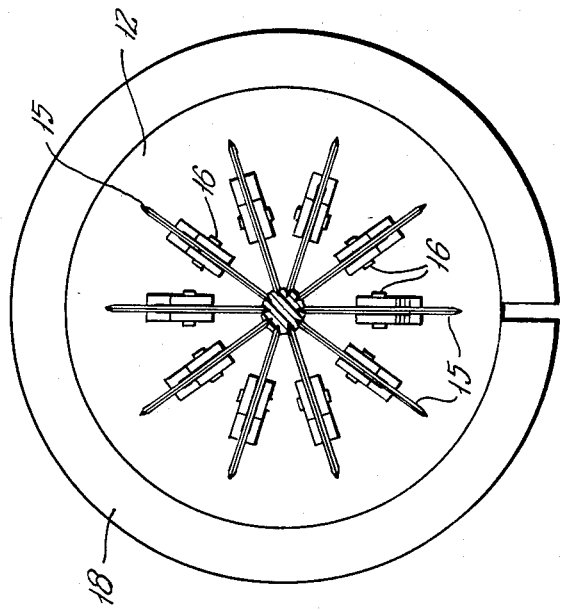
FIG. 2 is a front view of the apparatus illustrated in FIG. 1.

The apparatus which forms the grooves in the filament, comprises at least one means for feeding said filament, a centering means for guiding the filament along the advancing line, a pulling means along the same line of advancement, as well as a means for forming the grooves, i.e. a shaping-die. The shaping-die is illustrated in FIGS. 1 and 2, while the feeding means, pay-off bobbin, extruder, the guiding or centering means (pulley, caterpillar etc.) or the pulling means (fly-wheel, caterpillar, collectinb bobbin etc.) are not illustrated in FIGS. 1 and 2.

The means for forming the grooves, the shaping-die, comprises an assembly of upsetting means (see FIG. 3) coaxially disposed around the line of advance X—X of the filament 11 coming from the feeding means and passed through a centering means (not illustrated). The guiding or centering means can also coincide with the extrusion-die, should the feeding of the filament take place by means of extrusion.

The shaping-die comprises upsetting means 10 sustained by a support 12, the support 12 being coaxial to the line of advance X—X and being provided with an axial, longitudinal through-hole 13 having a diameter which is greater than that of the filament 11. In said through-hole 13, there can be included a further centering element 14 for the filament 11.

In the exemplified case, the upsetting means 10 comprises small idler wheels each of which is mounted on its own axis 16. The axes of the small wheels are, preferably, at an angle with respect to the advancing line X—X when the grooves have a helicoidal path in one direction. Nevertheless, owing to the large screw pitch (pitch of the helix) and to the small diameter of the filament, wheels having their axis perpendicular to the plane of line of advance X—X are also satisfactory.

Of course, the upsetting means can also have a form different from the one illustrated, for example, small spheres, small cylinders etc.

Each of the wheels 15 is secured to the support 12 by a bracket 17. In the illustrated case, the bracket 17 is fixed and inclined with respect to the line X—X, in such a manner as to provide the upsetting pressure in the manner that is required by the material being utilized and by the type of grooves desired. The obtaining of the upsetting pressure can, of course, be obtained in a different way, such as, for example, by not rigidly securing the bracket 17 to support 12, and by applying pressure to the bracket 17 by suitable pressure elements, such as, springs etc. Since the "upsetting" shifts material towards the outside of the grooves in lateral relation to it and longitudinally, the filament which is fed continuously from the feeder, has an outer diameter which is smaller, by a predetermined quantity, than the final diameter of the circumference circumscribing the outermost edges of the grooved core which will be obtained, with the upsetting operation. The material, that constitutes the outside of the filament, is made of plastic, and the groove formation can be carried-out by causing the filament 71, advancing continuously, to pass from the feeder, centered and subjected to an appropriate forward pulling along the line X—X of advancement, through the assembly of upsetting means, under proper pressure, simply at room temperature. However, in order to accelerate the upsetting operation and for reducing the "pull" necessary for causing the advancing, thereby speeding-up manufacturing operations, it is preferable to provide (as indicated in FIG. 1) heating means 18 for the upsetting means. The use of heating with the upsetting means allows for heating of the zone of the filament to be upset to the desired grade of plasticity or "softness". The temperature of softening in the zone to be upset will be lower than the melting-point temperature of the plastic.

In the illustrated case, the heating means 18 is an electrical heating element, such as nichrome wire, and the heat transfer takes place by conduction through the parts. A temperature-control is effectuated through an optical temperature controlling device 19 of a known type and which, by known circuits maintain the heating by the means 18 within the temperature ranges reguired.

The centering element 14, is made of a material which is a poor conductor of heat, for example, teflon, which has a good resistance to temperature.

However, the preferred heating system (not illustrated) comprises an induction heating system. This could, for example, consist of a spiral coil placed around the assembly of upsetting means 10, and without contact therewith, for creating a magnetic field that induces currents in the upsetting means. In this case, the wheels 15, 16 etc., preferably will be made of a ferro-magnetic material. Even in this case, the temperature-control could be carried out by an optical controlling device of the type described and illustrated.

Whenever it should be required to form helicoidal grooves on the filament 11, it is preferable to hold the feeding means and the means of centering and pulling stationary while, instead, causing the assembly of said upsetting means to rotate around, and coaxially to, the filament 11 while it is being fed along the line of advance X—X and coaxially to said line. The preferred solution is preferred because of the fact that, due to the small dimensions of the upsetting means assembly relative to the other elements constituting the apparatus, the mass to be rotated is small. The shaping-die, comprising the assembly of the upsetting means 10, rotates around the filament 11 with the number of turns per unit of time being proportional to the advancing speed of the filament itself. With this, it is possible to keep track of speed variables, occuring during the starting or the stopping of production, or other variations of translation speed which can be measured in such a way as to be able to have as constant as possble pitch of the groove.

If it is desired to obtain helicoidal grooves having a periodically alternating sense of rotation, the assembly of the upsetting means 10 will be caused to rotate in the periodically alternating sense around, and coaxially to, the filament 11.

An alternate solution can, however, keep the assembly of upsetting means 10 stationary, while along the axis of the means 10, coinciding with the line of advance X—X, the filament 11 is rotated with both the means for feeding the filament 11 as well as the pulling means being rotated around the line X—X.

The apparatus for realizing the method according to the invention, is particularly efficacious when it is combined with at least one means for inserting the optical fibers into a groove and a means for sealing these grooves containing the optical fibers. In this way, there would be constituted a line for producing continuously, an elementary cable with optical fibers.

Figure 3:
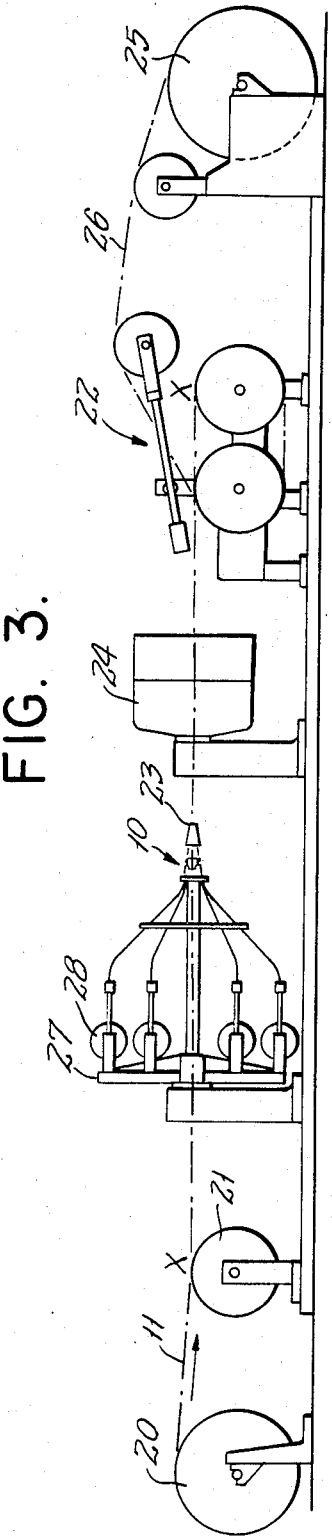
FIG. 3 illustrates, diagrammatically, a continuous production line for manufacturing an elementary cable with optical fibers, the production line including the apparatus for creating the grooves in an elongated filament illustrated in FIGS. 1 and 2.

Apparatus of this type, is illustrated in FIG. 3. In FIG. 3, the numeral 20 represents the feeding means of a filament 11. In this particular case the feeding means 20 is an unwinding bobbin. The bobbin 20 is followed by a guiding or centering means, such as a pulley 21.

The filament 11 is subjected to an advancing "pull" as produced by the fly-wheel 22. Between the centering means 21 and the fly-wheel 22, there is applied a shaping-die comprising the assembly of upsetting means 10. Downstream of the latter, but upstream of the fly-wheel, there is provided a means 23 for inserting one or several optical fibers inside the grooves. The inserting means 23, is provided with its own bobbin-cage 27. The inserting means 23 is rigidly connected to the shaping-die 10, through, for example, a transmission shaft (not shown) which causes the applicator 23 to follow the die 10 as it is rotated. The applicator 23 is followed by a means 24 for sealing the grooves containing the optical fibers.

In the example, the sealing means 24 is a wrapping head. Of course, there could be also provided a different means, such as, an extrusion-head. However, it is preferable for the sealing to take place in a first step, with wrapping. When a wrapping is lacking, the extrudate could in fact penetrate into a groove and so damage the fiber itself.

Downstream of the fly-wheel 22, there is a collecting means 25 in the form of a take-up bobbin for the elementary cable 26 which includes sealed optical fibers.

In particular, the apparatus for producing grooves, or the shaping-die according to the present invention, could be, preferably, but not exclusively, combined with a means for inserting optical fibers into the grooves or an applicator of the type described in Canadian Patent Application No. 396,207 filed Feb. 12, 1982 of the present applicant.

Said means 23 for inserting the optical fibers is provided with at least lay-down tongues having a number at least equal to the number of grooves which are directed radially and provided on the inner cylindrical cavity of a rigid body surrounding the filament 11. Each of said tongues is appropriate for engaging with a corresponding groove for establishing between core and rigid body, an engagement of the screw female-thread type, there being, in each tongue that is provided, the exit aperture of a rectilineal through-hole which traverses in an inclined direction with respect to the axis of said core, said rigid body being the entrance-aperture of said through-hole provided upon the outer surface of said rigid body and directed towards the feeding means of the optical fibers, with each through-hole constituting a path for transferring the optical fiber into the groove.

An elongate cylindrical body or filament 11, as it unwinds from the bobbin 20, is payed-off continuously in the direction of the arrow "F", with a translatory motion. The filament 11 has an outer diameter that is smaller, by a predetermined amount, than the final diameter of the circumference of a circle circumscribing outermost portions of the grooved core.

The centering pulley 21, or some other equivalent means, guides or directs the filament 11 along the prefixed line of advance X—X, along which it is pulled by the fly-wheel 22 or by some other means similar to this.

During the path along the line of advance X—X, the filament 11 passes through the shaping-die comprising the assembly of the upsetting means 10, which are coaxial to it. The shaping-die, described hereinbefore and in connection with FIGS. 1 and 2, is rotated around its own axis and upsets the filament 11 along helicoidal zones, thereby forming grooves corresponding to said zones.

Since the shaping-die comprises the assembly of upsetting means 10 rigidly connected to the inserting means 23, the tongues of the latter engage with corresponding grooves while inserting therein the optical fibers which come from the bobbins 28 which are supported by the bobbin-cage 27.

The filament 11, which issues forth from the inserting means 23, and hence, which already contains one or several optical fibers in each groove, passes next through the wrapping head 24 which provides for the scaling of the grooves.

Downstream of the fly-wheel 22 the filament provided with grooves containing optical fibers and sealed, at least by reason of the wrapping, constitutes in practice, an elementary cable 26 that is taken-up on the bobbin 25.

In a preferred embodiment, at least the shaping-die, comprising the assembly of upsetting means 10, and hence, the inserting means 23, the wrapping head 24 and the fly-wheel 22, are moved by a simple motor by means of a connecting shaft in such a way as to keep constant the ratio between the advancing speed and the rotational speed. This allows for keeping the helix-pitch constant during the speed changes (starting and stopping).

The line of FIG. 3 could also comprise other alternative means. For example, in place of the unwinding bobbin 20, there could be had an extrusion head for extruding a plastic material around at least one longitudinal reinforcing means, followed by stabilizing means for the extruded material, for example, cooling means. Between the inserting means 23 and the bindinghead 24, there could be provided a means for inserting a viscous substance or jelly into the fiber-containing grooves.

The embodiment described, whereby the filament 11 moves with a translatory motion along the line X—X and the assembly of upsetting means 10 and the inserting means 22 having a rotary motion around its own axis coincident with line X—X and with the axis of the filament 11, is the preferred embodiment mainly because it requires only the rotation of the bodies having a small mass.

Nevertheless, it has not to be excluded that, in particular situations which have to be taken into account from time to time, there should be preferred the solution whereby the bobbin 20, the centering means 21, the fly-wheel 22 and the take-up bobbin 25, all enter into rotation around line X—X. In this case, the assembly of upsetting means 10 and the inserting means 23, as well as the binding head 24, will be stationary. In this case also, the filament 11 moves with a roto-translatory motion.

Whenever it should also be desired to insert into the grooves a fiber having a greater length than the longitudinal path of the groove itself, it is enough to stop the centering pulley 21, in such a way as to give to the filament an elastic stretching. The filament 11 will reacquire then, its original length downstream of the flywheel 22.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Method for manufacturing an elongated, optical fiber cable, core element with a longitudinally extending, surface groove or longitudinally extending surface grooves of a predetermined depth for receiving an optical fiber or fibers, said method comprising:

continuously advancing by pulling, along a line of advance, an elongated filament comprising a reinforcing core with an outer layer of thermoplastic material of a thickness sufficient to provide said groove or grooves of said predetermined depth, said outer layer being without said groove or grooves at the outer surface thereof and said reinforcing core having a greater resistance to tension and compression forces than said thermoplastic material; and as said filament is advanced, pressing the heated surface of a rotatable upsetting means into said outer layer of thermoplastic material at the circumferential portions of the filament where the groove or grooves are to be formed to displace softened thermoplastic material without removing it from the filament, said surface being movable by the thermoplastic material substantially in the direction of advance of said filament.

2. Method as set forth in claim 1 wherein said upsetting means is heated to a temperature above room temperature but below the melting point temperature of the thermoplastic material.

3. Method as set forth in claim 1 wherein said upsetting means is rotated around the axis of said filament as it is advanced so that a helicoidal groove or helicoidal grooves are formed in the filament.

4. Method as set forth in claim 1 wherein said upsetting means is periodically rotated around the axis of said filament in a first direction and then in a second, opposite direction.

5. Method as set forth in claim 1 wherein said upsetting means is prevented from rotating and said filament is rotated around its axis as the filament is advanced.

6. Apparatus for manufacturing an elongated, optical fiber cable, core element with a longitudinally extending, surface groove or longitudinally extending, surface grooves of a predetermined depth for receiving an optical fiber or fibers, said apparatus comprising:

means for supplying an elongated filament comprising a reinforcing core with an outer layer of thermoplastic material of a thickness sufficient to provide said groove or grooves of said predetermined depth, said outer layer being without said groove or grooves at the outer surface thereof and said reinforcing core having a greater resistance to tension and compression forces than said thermoplastic material;

rotatable upsetting means for receiving said filament, said upsetting means corresponding in number and circumferential spacing to the number and circumferential spacing of the grooves to be formed and each having a width corresponding to the width of the groove to be formed thereby and said upsetting means having an axis of rotation substantially perpendicular to the line of advance of the filament;

pulling means for continuously advancing said elongated filament longitudinally thereof and past said upsetting means with said upsetting means in contact with said outer layer;

means for pressing said upsetting means into said outer layer of thermoplastic material as said elongated filament is advanced so as to displace said thermoplastic material without removing it from the filament where the groove or grooves are to be formed;

optical fiber inserting means for inserting at least one optical fiber in a groove or each of the grooves downstream of said upsetting means; and sealing means downstream of said optical fiber inserting means for covering the groove or grooves with the optical fiber therein.

7. Apparatus as set forth in claim 6 further comprising means for rotating said upsetting means around the axis of said filament, means for rotating said sealing means around the axis of said filament and means for rotating said optical fiber inserting means around the axis of said filament.

8. Apparatus as set forth in claim 7 comprising common drive means for each of said rotating means.

9. Method for manufacturing an elongated, optical fiber cable, core element having a reinforcing core with an outer layer of thermoplastic material with a longitudinally extending, continuous, surface groove or longitudinally extending, continuous surface grooves having an uninterrupted wall and having an optical fiber or fibers therewithin, said method comprising:

providing an elongated filament comprising a reinforcing core with an outer layer of thermoplastic material of a thickness sufficient to provide said groove or grooves, said outer layer being without said groove or grooves at the outer surface thereof and said reinforcing core having a greater resistance to tension and compression forces than said thermoplastic material;

continuously advancing said elongated filament by pulling said elongated filament in the direction of its axis past an upsetting means having an upsetting surface which is movable by the thermoplastic material substantially in the direction of advance of said filament and forming the groove or grooves by pressing said upsetting surface into the outer layer as said elongated filament is advanced, said elongated filament being pulled axially and relative to said surface, while said surface is pressed into said outer layer, at a rate which causes axial and lateral displacement of said outer layer with respect to the surface in contact with the outer layer thereby causing material of said outer layer to be displaced and upset by said surface to form the groove or grooves without removing material from said elongated filament.

10. Method as set forth in claim 9 further comprising heating said upsetting means to a temperature above room temperature but below the melting point temperature of the thermoplastic material.

11. Method as set forth in claim 9 wherein said upsetting means is rotated around the axis of said filament as it is advanced so that a helicoidal groove or helicoidal grooves are formed in the filament.

12. Method as set forth in claim 9 wherein said upsetting means is periodically rotated around the axis of said filament in a first direction and then in a second, opposite direction.

13. Method as set forth in claim 9 wherein said upsetting means is prevented from rotating around the axis of said filament and said filament is rotated around its axis as the filament is advanced.

14. Apparatus for manufacturing an elongated, optical fiber cable, core element having a reinforcing core and an outer layer of thermoplastic material with a longitudinally extending, surface groove or longitudinally extending, surface grooves of a predetermined depth for receiving an optical fiber or fibers therewithin, said apparatus comprising:
  means for supplying an elongated filament comprising a reinforcing core with an outer layer of thermoplastic material of a thickness sufficient to provide said groove or grooves, said outer layer being without said groove or grooves at the outer surface thereof and said reinforcing core having a greater resistance to tension and compression forces than said thermoplastic material;
  upsetting means for receiving said filament, said upsetting means having an upsetting surface or surfaces corresponding in number and circumferential spacing to the number and circumferential spacing of the grooves to be formed and each surface having a width corresponding to the width of the groove to be formed and being movable by the thermoplastic material substantially in the direction of advance of said filament;
  pulling means for continuously pulling said elongated filament axially thereof and past said upsetting surface or surfaces, with said upsetting surface or surfaces in contact with said outer layer, at a rate which causes axial and lateral displacement of the outer layer with respect to the surface or surfaces in contact therewith;
  means for pressing said upsetting means into said outer layer of thermoplastic material as said elongated filament is pulled so as to displace said thermoplastic material without removing it from the filament where the groove or grooves are to be formed;
  optical fiber inserting means for inserting at least one optical fiber in a groove or each of the grooves downstream of said upsetting means; and
  sealing means downstream of said optical fiber inserting means for covering the groove or grooves with the optical fiber therein.

15. Apparatus as set forth in claim 14 further comprising means for rotating said upsetting means around the axis of said filament, means for rotating said sealing means around the axis of said filament and means for rotating said optical fiber inserting means around the axis of said filament.

16. Apparatus as set forth in claim 15 comprising common drive means for each of said rotating means.

* * * * *